United States Patent
Lee

(10) Patent No.: US 11,875,257 B2
(45) Date of Patent: Jan. 16, 2024

(54) NORMALIZATION METHOD FOR MACHINE-LEARNING AND APPARATUS THEREOF

(71) Applicant: Lunit Inc., Seoul (KR)

(72) Inventor: Jae Hwan Lee, Seoul (KR)

(73) Assignee: LUNIT INC., Seoul (KR)

( * ) Notice: Subject to any disclaimer, the term of this patent is extended or adjusted under 35 U.S.C. 154(b) by 200 days.

(21) Appl. No.: 17/320,424

(22) Filed: May 14, 2021

(65) Prior Publication Data

US 2021/0271938 A1     Sep. 2, 2021

Related U.S. Application Data

(62) Division of application No. 16/535,314, filed on Aug. 8, 2019, now Pat. No. 11,042,789.

(30) Foreign Application Priority Data

Apr. 29, 2019    (KR) ........................ 10-2019-0049694

(51) Int. Cl.
    *G06N 3/08*           (2023.01)
    *G06F 18/10*         (2023.01)
    *G06F 18/213*       (2023.01)
    *G06V 10/77*         (2022.01)
    *G06V 10/82*         (2022.01)

(52) U.S. Cl.
    CPC .............. *G06N 3/08* (2013.01); *G06F 18/10* (2023.01); *G06F 18/213* (2023.01); *G06V 10/7715* (2022.01); *G06V 10/82* (2022.01)

(58) Field of Classification Search
CPC .. G06K 9/6298; G06K 9/6202; G06K 9/6232; G06K 9/66; G06K 9/42; G06K 9/4628; G06K 9/6267; G06K 9/6274; G06K 9/6218; G06K 9/6256; G06K 9/6292; G06N 3/08; G06N 3/0454; G06N 3/084; G06N 3/0427; G06N 3/0445; G06N 3/0472; G06N 3/0481; G06N 20/00; G06N 3/045; G06N 3/048; G06T 2207/20084; G06T 2207/20081; G06T 7/0012; G06F 18/10; G06F 18/213; G06V 10/7715; G06V 10/82
See application file for complete search history.

(56) References Cited

U.S. PATENT DOCUMENTS

| | | | |
|---|---|---|---|
| 9,594,977 B2 * | 3/2017 | Lin | G06T 7/60 |
| 9,940,551 B1 * | 4/2018 | Mordvintsev | G06F 18/2413 |
| 10,025,976 B1 * | 7/2018 | Sarraf | G06V 30/333 |
| 10,325,201 B1 * | 6/2019 | Kim | G06N 3/088 |
| 10,325,351 B2 * | 6/2019 | Rad | G06T 3/4046 |

(Continued)

*Primary Examiner* — Michael S Osinski
(74) *Attorney, Agent, or Firm* — LEX IP MEISTER, PLLC

(57) ABSTRACT

A normalization method for machine learning and an apparatus thereof are provided. The normalization method according to some embodiments of the present disclosure may calculate a value of a normalization parameter for an input image through a normalization model before inputting the input image to a target model and normalize the input image using the calculated value of the normalization parameter. Because the normalization model is updated based on a prediction loss of the target model, the input image can be normalized to an image suitable for a target task, so that stability of the learning and performance of the target model can be improved.

10 Claims, 24 Drawing Sheets

(56) References Cited

U.S. PATENT DOCUMENTS

| | | | |
|---|---|---|---|
| 10,423,823 B1* | 9/2019 | Sarkar | G06N 3/048 |
| 10,824,944 B2* | 11/2020 | Lee | G06N 3/08 |
| 10,891,731 B2* | 1/2021 | Brestel | G06F 18/24 |
| 11,024,013 B2* | 6/2021 | Halupka | G06T 5/50 |
| 2004/0111384 A1* | 6/2004 | Shin | G06N 20/00 |
| | | | 706/25 |
| 2006/0083423 A1* | 4/2006 | Brown | G06V 20/40 |
| | | | 382/190 |
| 2006/0103728 A1* | 5/2006 | Ishigami | H04N 23/88 |
| | | | 348/180 |
| 2007/0279659 A1* | 12/2007 | Hasegawa | H04N 1/6058 |
| | | | 358/1.9 |
| 2009/0196494 A1* | 8/2009 | Kanai | G09G 5/06 |
| | | | 382/162 |
| 2011/0255101 A1* | 10/2011 | Edge | H04N 1/6058 |
| | | | 358/1.9 |
| 2013/0034263 A1* | 2/2013 | Ding | G06V 10/7715 |
| | | | 382/103 |
| 2016/0358038 A1* | 12/2016 | Jaderberg | G06V 10/454 |
| 2017/0262962 A1* | 9/2017 | Rad | G06V 10/82 |
| 2018/0373999 A1* | 12/2018 | Xu | G06V 10/774 |
| 2018/0374216 A1* | 12/2018 | Hu | G06V 10/7715 |
| 2019/0045163 A1* | 2/2019 | Nikkanen | H04N 9/646 |
| 2019/0108621 A1* | 4/2019 | Condorovici | G06T 5/001 |
| 2019/0114462 A1* | 4/2019 | Jang | G06F 18/2411 |
| 2019/0185186 A1* | 6/2019 | Li | G06V 10/757 |
| 2019/0197679 A1* | 6/2019 | Fang | G06N 3/084 |
| 2019/0205611 A1* | 7/2019 | Lo | G06V 10/32 |
| 2019/0236411 A1* | 8/2019 | Zhu | G06T 3/4046 |
| 2019/0325802 A1* | 10/2019 | Aly | G09G 5/005 |
| 2020/0026953 A1* | 1/2020 | Shao | G06V 10/82 |
| 2020/0151502 A1* | 5/2020 | Huang | G06V 40/161 |
| 2020/0154039 A1* | 5/2020 | Yu | G06T 5/007 |
| 2020/0174840 A1* | 6/2020 | Zhao | G06F 9/5011 |
| 2020/0250497 A1* | 8/2020 | Peng | G06N 3/045 |
| 2020/0286208 A1* | 9/2020 | Halupka | G06N 3/047 |
| 2020/0320685 A1* | 10/2020 | Anssari Moin | G06V 10/454 |
| 2020/0327663 A1* | 10/2020 | Namgoong | A61B 5/7264 |
| 2020/0349673 A1* | 11/2020 | Yoo | G06T 5/003 |
| 2020/0372694 A1* | 11/2020 | Hwang | G06T 11/40 |
| 2021/0076016 A1* | 3/2021 | Sviridenko | G06T 9/002 |
| 2021/0092342 A1* | 3/2021 | Yuan | H04N 9/68 |
| 2021/0166350 A1* | 6/2021 | Wang | G06F 18/214 |
| 2022/0305291 A1* | 9/2022 | Hibbard | A61N 5/1049 |

\* cited by examiner

NORMALIZATION METHOD FOR MACHINE-LEARNING AND APPARATUS THEREOF

CROSS-REFERENCES TO THE RELATED APPLICATIONS

This application is a division of U.S. patent application Ser. No. 16/535,314 filed on Aug. 8, 2019 which claims priority from Korean Patent Application No. 10-2019-0049694 filed on Apr. 29, 2019, in the Korean Intellectual Property Office, the disclosure of which is incorporated herein by reference in its entirety.

BACKGROUND

(a) Field

The present disclosure relates to a normalization method for machine learning and an apparatus thereof. In particular, the present disclosure relates a method for improving the performance of a target model by eliminating a latent bias present in an input image and normalizing the input image to an image suitable for a target task, and an apparatus for supporting the method.

(b) Description of the Related Art

A convolutional neural network is a machine learning model that is specialized for image recognition tasks. The convolutional neural network is one of the most popular models in various domains for image processing because it can automatically extract features from the input image and perform the tasks such as object classification and object recognition with high accuracy.

Although the convolution neural network is the model of imitating the human visual recognition process, but a way in which the convolution neural network recognizes the image is quite different from a way in which visual cells recognize the image. The convolutional neural network recognizes the input image by analyzing pixel information (e.g., intensity, brightness, saturation, color, and the like.) of the image in various ways. Due to the way the convolutional neural network operates, the latent bias present in the image can act as a factor impeding learning of the convolutional neural network. Further, the latent bias of the image can occur by various causes such as the image processing technique, the parameters of the imaging device and/or the difference in the imaging environment.

For the same reason as above, the pixel information of the image that can maximize the recognition performance of the convolutional neural network can be changed depending on the target task of the corresponding neural network. For example, a first convolution neural network that performs a first task may exhibit the best recognition performance when learning images having an intensity of a first range, but a second convolution neural network that performs a second task may exhibit the better recognition performance in an intensity of a the second range. However, a methodology for informing the pixel information of the most appropriate image to the target task has not been proposed.

SUMMARY

Some embodiments of the present disclosure provide a method of normalizing an input image to an image optimized for a target model (or a target task) to improve the performance of the target model, and an apparatus supporting the method.

Some embodiments of the present disclosure provide a method for removing a latent bias present in an input image to improve the stability of learning, and an apparatus supporting the method.

Some embodiments of the present disclosure provide a method of automatically calculating a value of a parameter capable of transforming an original image into a form of a target image, and an apparatus supporting the method.

It should be noted that objects of the present disclosure are not limited to the above-described objects, and other objects of the present disclosure will be apparent to the person of ordinary skill in the art from the following descriptions.

According to some embodiments of the present invention, a normalization method for machine learning performed by a computing device may be provided. The computing device may calculate a value of a normalization parameter for an input image through a normalization model, normalize the input image using the calculated value of the normalization parameter, acquire a predicted label for the normalized input image through a target model, and update the normalization model based on a loss of the predicted label.

According to some embodiments of the present invention, an image transformation method performed by a computing device may be provided. The computing device may calculate a value of a transformation parameter for a first image through an image transformation model, transform the first image using the calculated value of the transformation parameter, learn the image transformation model based on a loss between the transformed first image and a target image, and calculate a value of a transformation parameter for the second image using the learned image transformation model.

According to some embodiments of the present invention, a normalization apparatus including a memory that stores one or more instructions and a processor may be provided. By executing the stored one or more instructions, the processor may calculate a value of a normalization parameter for an input image through a normalization model, normalize the input image using the calculated value of the normalization parameter, acquire a predicted label for the normalized input image through a target model, and update the normalization model based on a loss of the predicted label.

DETAILED DESCRIPTION OF THE EMBODIMENTS

Figure 1:
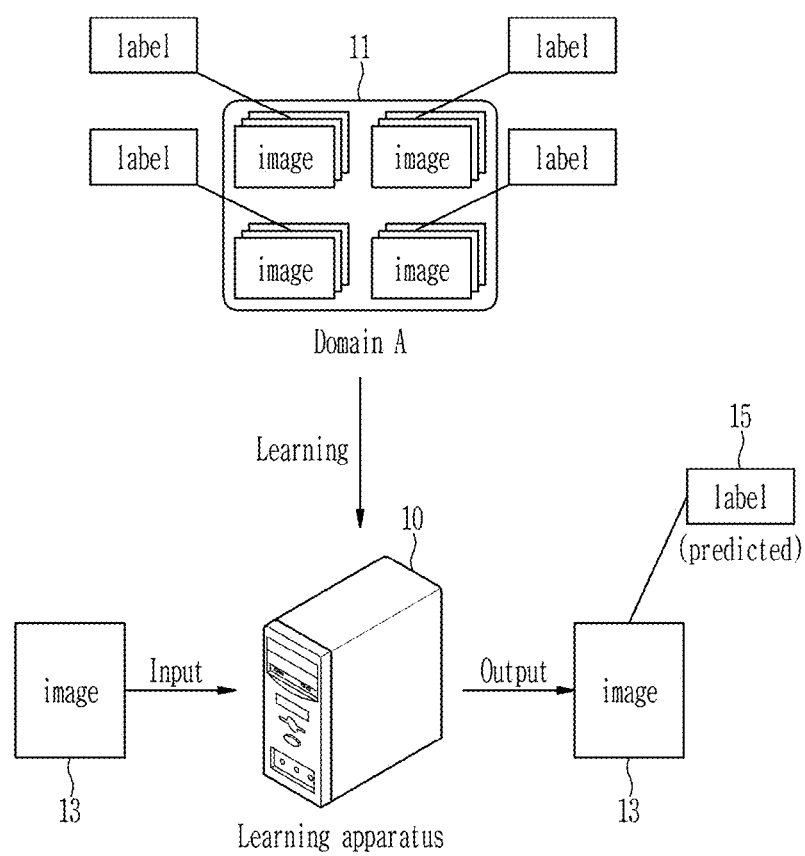
FIG. 1 and FIG. 2 are drawings for explaining a machine learning apparatus and a learning environment according to some embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to the person of ordinary skill in the art, and the present disclosure will only be defined by the appended claims. Like reference numerals designate like elements throughout the specification.

Unless otherwise defined, all terms (including technical and scientific terms) used herein have the same meaning as commonly understood by the person of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms "a", "an" and "the" are intended to include the plural forms as well, unless the context clearly indicates otherwise.

It will be further understood that, although the terms first, second, A, B, (a), (b), and the like may be used herein to describe various elements, components, steps and/or operations. These terms are only used to distinguish one element, component, step or operation from another element, component, step, or operation. Thus, a first element component, step or operation discussed below could be termed a second element, component, step or operation without departing from the teachings of the present inventive concept. It will be further understood that when an element is referred to as being "connected to" or "coupled with" another element, it can be directly connected or coupled with the other element or intervening elements may be present.

It will be further understood that the terms "comprise" or "comprising", "include" or "including", and "have" or "having" specify the presence of stated elements, steps, operations, and/or devices, but do not preclude the presence or addition of one or more other elements, steps, operations, and/or devices.

Before description of this specification, some terms used herein will be clarified.

As used herein, the term "task" refers to an assignment to be solved through machine learning or a work to be done through machine learning. As an example, in a case of performing face recognition, facial expression recognition, sex classification, pose classification, and the like from face information, each of the face recognition, the facial expression recognition, the sex classification, and the pose classification may correspond to an individual task. As another example, in a case of performing recognition, classification, prediction, and the like on an anomaly from medical image data, each of the anomaly recognition, the anomaly classification, and the anomaly prediction may correspond to an individual task. A task may be referred to as a target task.

As used herein, the term "target model" may mean a model that performs a target task, and also a model to be constructed through machine learning. Since the target model may be implemented based on any machine learning model including a neural network, the technical scope of the present disclosure is not limited by the implementation way of the target model.

Figure 5:
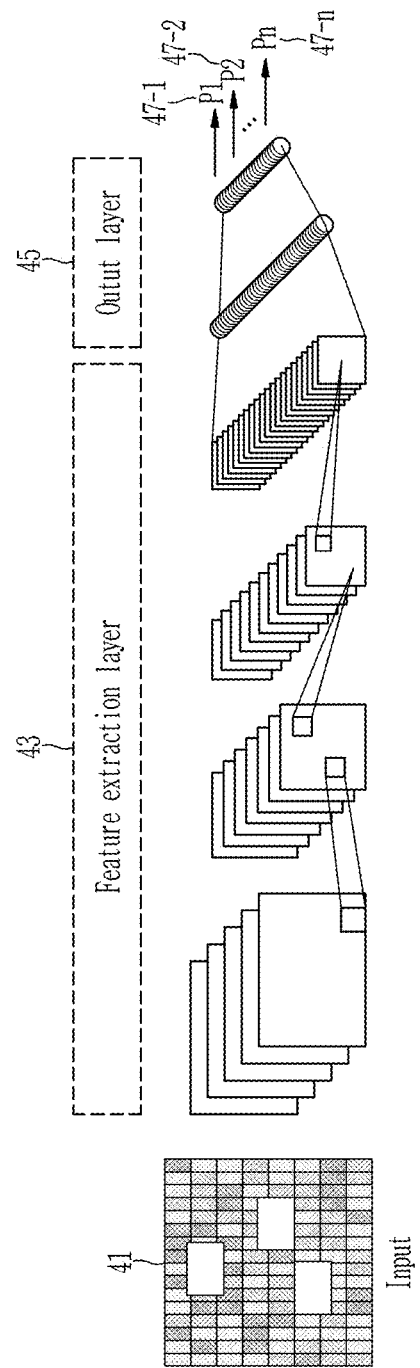
FIG. 5 is an exemplary drawing for explaining a structure of a normalization model and a process of calculating a normalization parameter according to some embodiments of the present disclosure.
Figure 6:
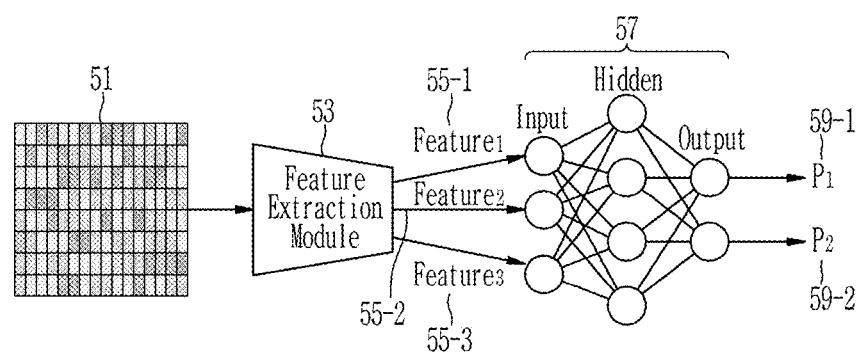
FIG. 6 is an exemplary drawing for explaining a structure of a normalization model and a process of calculating a normalization parameter according to some embodiments of the present disclosure.

As used herein, the term "normalization model" may mean a model that can calculate a value of a normalization parameter for a given image. Since the normalization model may be implemented in various ways, the technical scope of the present disclosure is not limited by the implementation way of the normalization model. Some examples of the normalization model are shown in FIG. 5 and FIG. 6.

As used herein, the term "image transformation model" may mean a model that can calculate a value of a transformation parameter for transforming a given image into a form of a target image. Since the image transformation model may be implemented in various ways, the technical scope of the present disclosure is not limited by the implementation way of the image transformation model.

As used herein, the term "neural network" encompasses any kind of machine learning model which imitates a neural structure. For example, the neural network may include any kind of neural network-based model, such as an artificial neural network (ANN) and a convolutional neural network (CNN).

As used herein, the term "instruction" refers to a series of computer-readable commands which are bound based on functionality. The instruction is an element of a computer program and executed by a processor.

Hereinafter, some embodiments of the present disclosure are described in detail with reference to the accompanying drawings.

FIG. 1 exemplifies a machine learning apparatus 10 and a learning environment according to some embodiments of the present disclosure.

As shown in FIG. 1, a machine learning apparatus 10 is a computing device that performs machine learning on a given image set 11 to perform a target task. More specifically, the machine learning apparatus 10 can construct a target model by performing the machine on the labeled image set 11. Further, the machine learning apparatus 10 can predict a label 15 of a prediction image 13 by performing the target task through the target model. Hereinafter, for convenience of description, the machine learning apparatus 10 is referred to as a "learning apparatus" 10.

Figure 15:
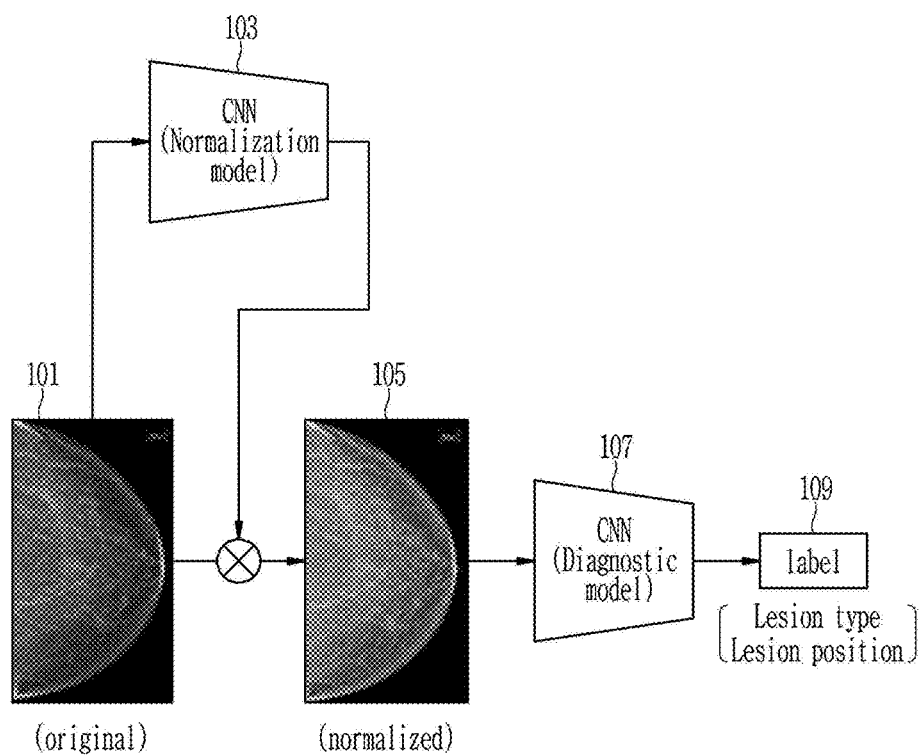
FIG. 15 is a drawing for explaining an example in which the technical concept of the present disclosure is used in a medical field.

The computing device may be a tablet computer, a desktop computer, a laptop computer, a server, or the like. However, the computing device is not limited thereto and may include any kind of device having a computing function. An example of the computing device is shown in FIG. 15.

Although FIG. 1 shows the learning apparatus 10 implemented as one computing device by way of example, in an actual physical environment, a first function of the learning apparatus 10 may be implemented by a first computing device, and a second function of the learning apparatus 10 may be implemented by a second computing device. Further, the learning apparatus 10 may be composed of a plurality of computing devices, and the plurality of computing devices may separately implement first and second functions.

According to various embodiments of the present disclosure, the learning apparatus 10 may normalize an input image using a value of a parameter calculated by a predetermined machine learning model, or may transform an input image into a form of a target image (e.g., tone-mapped image). Hereinafter, in order to clearly distinguish the use of the machine learning model, the machine learning model is referred to as a normalization model for embodiments related to the normalization, and the machine learning model is referred to as an image transformation model for embodiments related to the image transformation.

In some embodiments, the learning apparatus 10 may perform the normalization on the input image using a normalization model before each image is input to the target model. Further, the learning apparatus 10 may learn the target model using the normalized image or predict a label of the image. The normalization may be performed based on the value of the normalization parameter output from the normalization model. The normalization model may calculate the normalization parameter value appropriate to the target model (or target task) by learning a prediction loss of the target model. A configuration and operation of the normalization model will be described in detail with reference to FIG. 3 to FIG. 15. According to the present embodiment, since a latent bias present in the input image can be eliminated through the normalization before the input image is input to the target model, the stability of learning can be greatly improved. Further, through the normalization, pixel information of the input image may be corrected to be suitable for the target model (or target task) (e.g., values of pixels in a specific range being important for performing the task may be amplified). As a result, the performance of the target model can be greatly improved.

Figure 2:
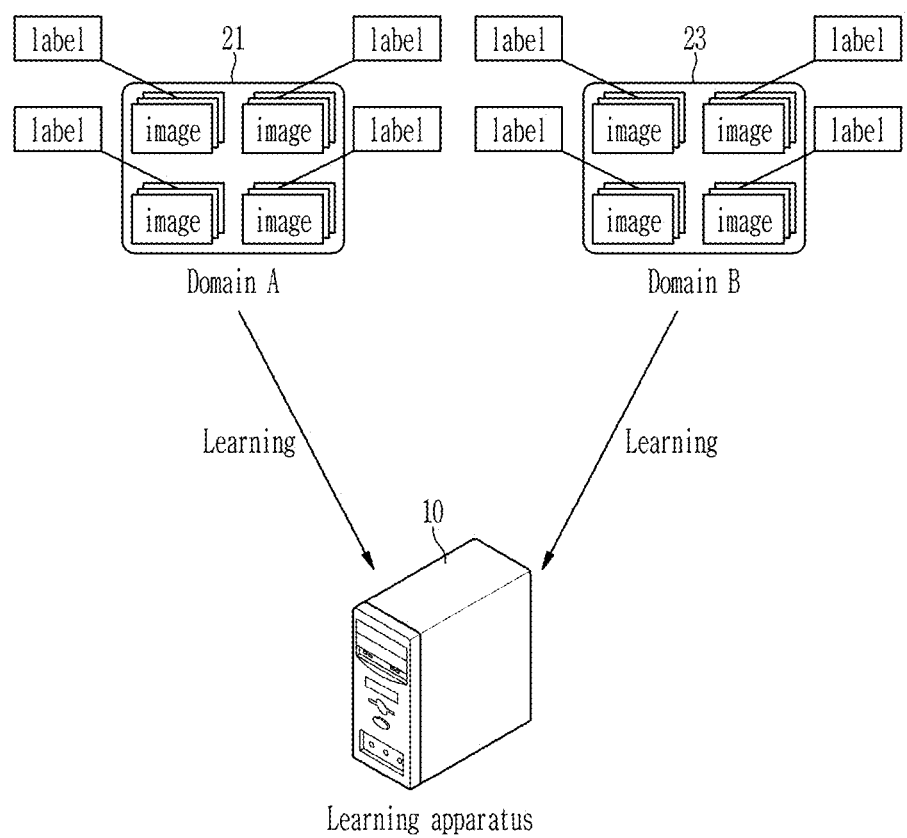

Further, in some embodiments, the learning apparatus 10 may perform multi-domain learning to further enhance the performance of the target model. For example, as shown in FIG. 2, the multi-domain learning may be performed by using image sets 21 and 23 belonging to different domains A and B. Here, a latent bias may exist in the image set 21 or 23 of each domain, due to various causes such as an imaging environment, a parameter of an imaging device, and/or a difference in an image processing technique. In this case, the learning apparatus 10 may remove the latent biases present in the image sets 21 and 23 through the normalization process, and normalize each image to an image suitable for the target model. As a result, the performance improvement by the multi-domain learning can be guaranteed.

As described above, in various embodiments of the present disclosure related to the normalization, the learning apparatus 10 may be referred to as a normalization apparatus 10.

Furthermore, in some embodiments, the learning apparatus 10 may construct an image transformation model that can transform an original image into a target image (e.g., a tone-mapped image) through machine learning. In addition, the learning apparatus 10 may provide a user with a value of a transformation parameter calculated by the image transformation model, or may transform the original image into the form of the target image using the value of the transformation parameter. In such embodiments, the learning apparatus 10 may be referred to as an image transformation apparatus 10. Hereinafter, for convenience of description, the image transformation model is referred to as a transformation model. Such embodiments will be described in detail with reference to FIG. 16 to FIG. 23.

The learning apparatus 10 and the learning environment according to some embodiments of the present disclosure have been described above with reference to FIG. 1 and FIG. 2. Next, an normalization method according to various embodiments of the present disclosure is described with reference to FIG. 3 to FIG. 14.

Each step of a method to be described below may be performed by a computing device. In other words, each step of the method may be implemented as one or more instructions which are executed by a processor of the computing device. Although all steps included in the method may be executed by one physical computing device, they may be distributed and executed on a plurality of computing devices. For example, first steps of the method may be performed by a first computing device, and second steps of the method may be performed by a second computing device. Assuming that each step of the method is performed by the learning apparatus 10 exemplified in FIG. 1 or FIG. 2, the method is described below. Therefore, when a subject of a specific operation is omitted in the following description, the corresponding operation may be considered to be performed by the exemplified learning apparatus 10. Further, in the method according to the present embodiment, an execution sequence of operations may be changed as necessary as long as the sequence is logically changed.

Figure 3:
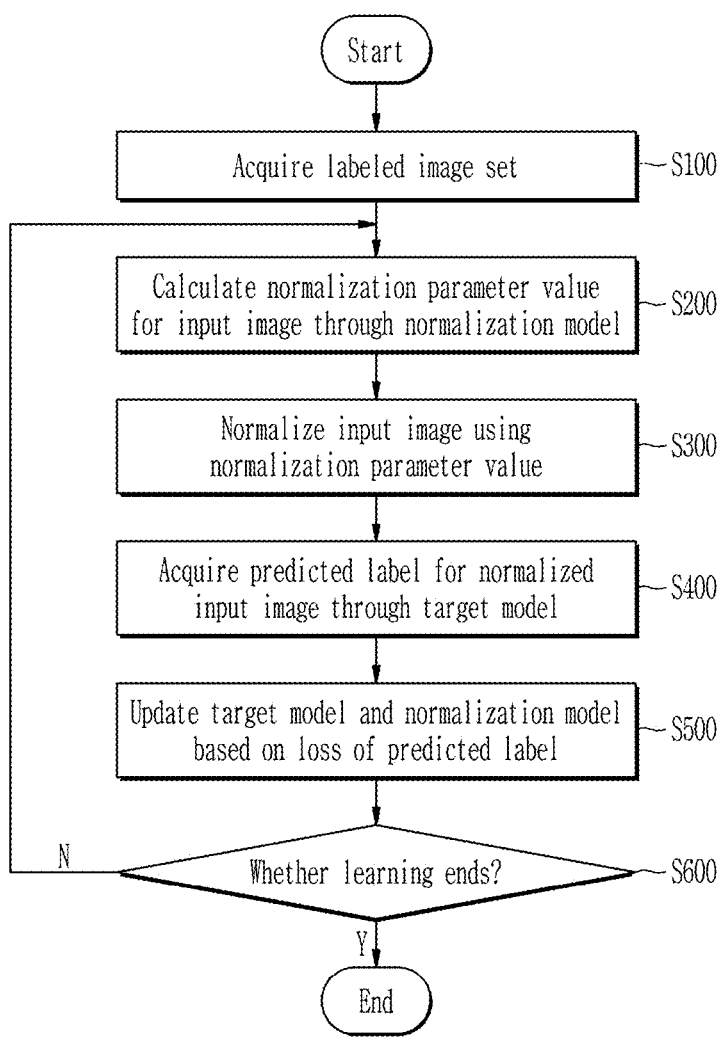
FIG. 3 is an exemplary flowchart showing a normalization method according to some embodiments of the present disclosure.

FIG. 3 is an exemplary flowchart showing a normalization method according to some embodiments of the present disclosure. In particular, FIG. 3 exemplifies a process of performing the normalization method in a learning process of a target process. However, the flowchart shown in FIG. 3 merely corresponds to an exemplary embodiment for achieving an object of the present disclosure, and some steps may be added or omitted as necessary.

As shown in FIG. 3, the normalization method begins with step S100 of acquiring a labeled learning image set. The learning image set may mean a data set for learning including a plurality of images.

In some embodiments, the image set may include a plurality of image sets associated with different domains. As an example, the image set may include a first image set generated by a first imaging device and a second image set generated by a second imaging device. As another example, the image set may include a first image set generated by a first image processing technique and a second image set generated by a second image processing technique. Here, the image processing technique may include any kind of processing technique such as image transformation, image filtering (e.g., bayer filter, etc.), or image correction (e.g., white balancing, crop, auto-focusing, etc.). In this case, the normalization may remove a latent bias caused by the different imaging devices or the different image processing techniques. As a result, the performance of a target model by the multi-domain learning can be further improved.

Steps S200 and S300 show a normalization process for an input image. The input image may mean an image input to a target model. As exemplified in FIG. 4, the input image 31 may be transformed into a normalized image 34 based on a normalization model 33 before the input image 31 is input to a target model 35. In addition, the normalized image 34 may be input to the target model 35. A reason for normalizing the input image 31 before the input image 31 is input to the target model 35 is to induct the stable learning and prevent the overfitting by removing the latent bias. Another reason is to adjust the pixel information of the input image 31 to be suitable for the target task. Next, steps S200 and S300 are described in detail.

In step S200, a value of a normalization parameter for the input image is calculated through the normalization model. The normalization model includes a learnable parameter that may be learned based on a prediction loss of the target model (i.e., be learned to minimize the prediction loss). Accordingly, the normalization model can accurately calculate the normalization parameter value for transforming the input image into an image suitable for the target task.

The normalization model may be variously designed and selected according to embodiment. In addition, a specific method of calculating the normalization parameter value may also vary depending on embodiments.

In some embodiments, the normalization model may be implemented based on a convolutional neural network. For example, as shown in FIG. 5, the normalization model may be implemented as a convolutional neural network including a feature extraction layer 43 and an output layer 45. The feature extraction layer 43 may include a convolution layer, and may further include various layers such as a pooling layer and the like optionally. In this case, the normalization model may extract feature data (e.g., feature map) from an input image 41 through the feature extraction layer 43 and calculate at least one prediction value 47-1 to 47-n based on the feature data through the feature extraction layer 43. The at least one prediction value 47-1 to 47-n may be used as the normalization parameter value. In some embodiments, a specific value derived from the prediction values 47-1 to 47-n may be used as the normalization parameter value. Since the convolutional neural network is a neural network specialized for image recognition, a relationship between the input image and the normalization parameter can be most accurately understood and grasped. Thus, according to the present embodiment, the normalization effect can be further improved by utilizing characteristics of the convolutional neural network specialized for the image. Meanwhile, the normalization model may be implemented based on various machine learning models other than the convolution neural network described above.

In some embodiments, a predefined feature may be extracted from the input image, and the normalization model may calculate the normalization parameter value based on the predefined feature. That is, in the present embodiment, the normalization model may not automatically extract the feature from the input image but the predefined feature may be used. Here, the predefined feature may include style information (e.g., various statistical information such as an average, a standard deviation or the like) of the image, a pixel value pattern, statistical information of the pixel value, or the like. In addition, a feature that is well known in the art such as Scale Invariant Feature Transform (SIFT), Histogram of Oriented Gradient (HOG), Haar, or Local Binary Pattern (LBP) may be further included. A specific example of the present embodiment is shown in FIG. 6.

As shown in FIG. 6, a feature extraction module 53 may extract at least one (e.g., 55-1 to 55-3) of the exemplified features from an input image 51, and the extracted features 55-1 to 55-3 may be input to a normalization model 57. Then, the normalization model 57 may output normalization parameter values (e.g., 59-1 and 59-2) based on the input features 55-1 to 55-3. FIG. 6 shows an example in which the normalization model 57 is implemented as an artificial neural network, but the normalization model 57 may be implemented by other types of machine learning models. For example, the normalization model 57 may be implemented based on a traditional machine learning model such as SVM (Support Vector Machine). According to the present embodiment, the appropriate normalization parameter values can be calculated based on the important features designated by the user. For example, when a target task is a task closely related to style information, the normalization parameter value is calculated based on the style information of the input image so that the normalization suitable for the target task can be performed.

Referring back to FIG. 3, the normalization method is continuously described.

In step S300, the input image is normalized by using the normalization parameter value. The detailed process of this step may vary depending on embodiments. Next, various embodiments related to this step are described in detail with reference to FIG. 7 to FIG. 13.

Figure 7:
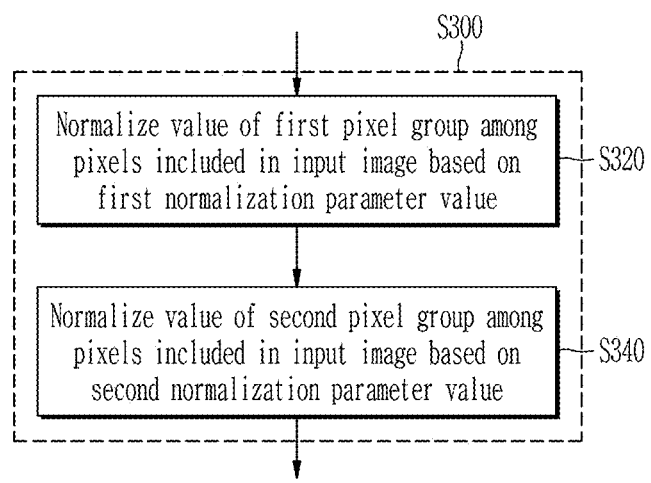
FIG. 7 is an exemplary flowchart showing a normalization process according to a first embodiment of the present disclosure.

First, a normalization process according to a first embodiment of the present disclosure is described with reference to FIG. 7 to FIG. 9.

In the first embodiment, a normalization parameter may be defined on the basis of ranges of pixel values, and normalization may be performed independently for each pixel value range. For example, it is assumed that a first normalization parameter is defined for a first pixel value range and a second normalization parameter is defined for a second pixel value range. In this case, as shown in FIG. 7, a first pixel group composed of pixels belonging to the first pixel value range may be normalized based on a value of the first normalization parameter, and a first pixel group composed of pixels belonging to the second pixel value range may be normalized based on a value of the second normalization parameter (S320 and S340). For convenience of understanding, it is further described with reference to an example shown in FIG. 8 and FIG. 9.

Figure 8:
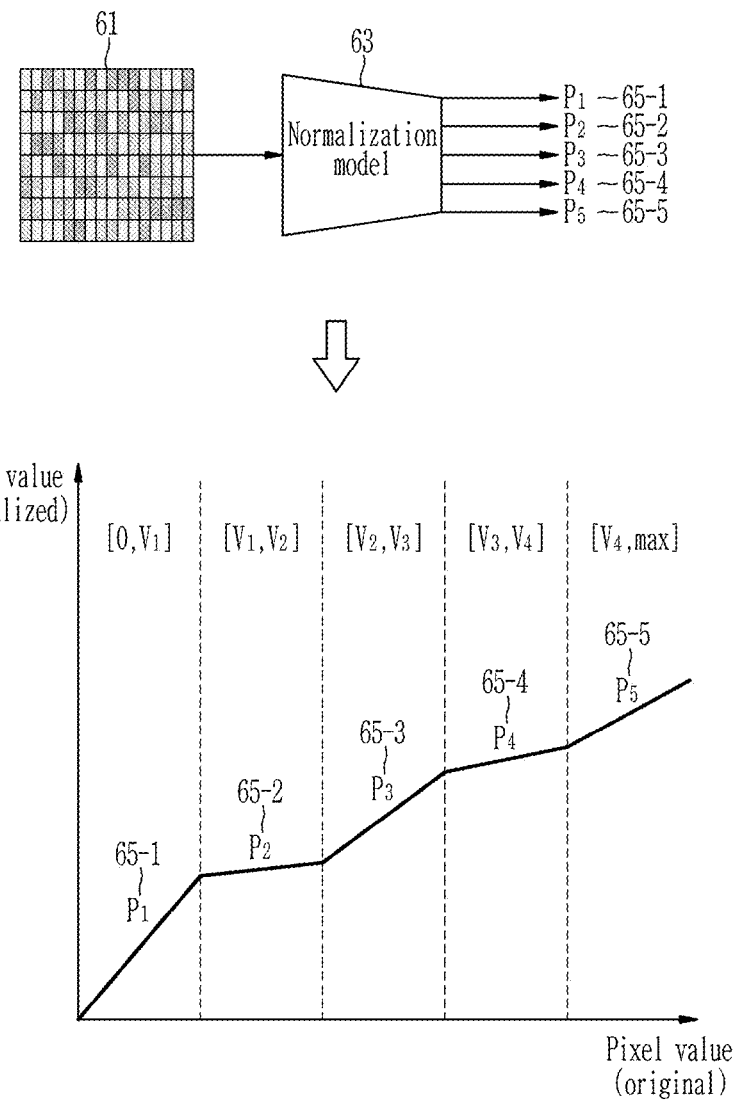
FIG. 8 and FIG. 9 are exemplary drawings for explaining a normalization process according to a first embodiment of the present disclosure.

FIG. 8 exemplifies that a normalization model 63 calculates values of five normalization parameters 65-1 to 65-5 and each of the normalization parameters 65-1 to 65-5 corresponds to pixel values in a specific range. For example, in FIG. 8, the first normalization parameter 65-1 corresponds to a pixel value range from 0 to v1, and the second normalization parameter 65-2 corresponds to a pixel value range from v1 to v2. The pixel value ranges corresponding to the respective normalization parameters 65-1 to 65-5 may be equal to or may be different from each other. In some examples, a pixel value range in which multiple pixels are distributed may be subdivided into a plurality of intervals, and different normalization parameters may be defined for each interval.

Figure 9:
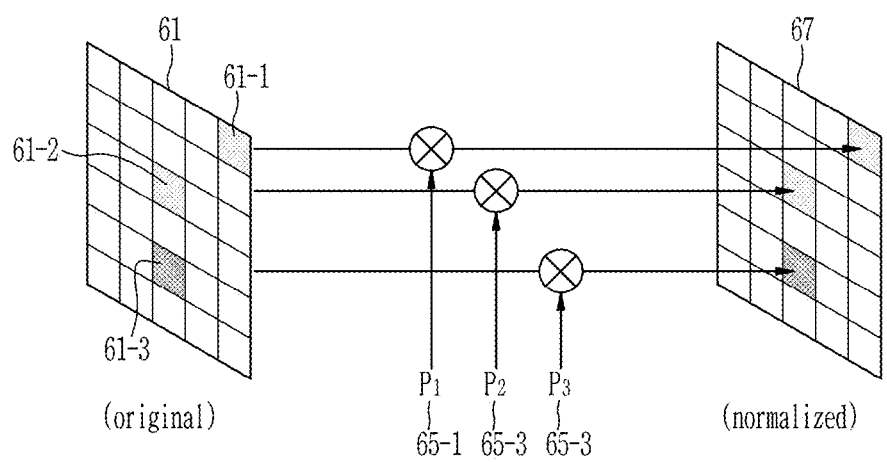

FIG. 9 exemplifies that the normalization is performed for each pixel of the input image 61. In particular, FIG. 9 exemplifies that, in the image 61, a value of a first pixel 61-1 included belongs to the first pixel value range, a value of a second pixel 61-2 belongs to the second pixel value range, and a value of a third pixel 61-3 belongs to the third pixel value range.

As exemplified in FIG. 9, the normalization may be performed independently for each pixel value range. Specifically, the value of the first pixel 61-1 may be adjusted by the first normalization parameter 65-1, the value of the second pixel 61-2 may be adjusted by the second normalization parameter 65-2, and the value of the third pixel 61-3 may be adjusted by the third normalization parameter 65-3. Once the pixel values of the input image 61 have been adjusted, the input image 61 may be transformed into a normalized image 67.

FIG. 8 and FIG. 9 exemplify that a normalization operation is performed by multiplying the pixel values of the input image 61 by the values of the normalization parameters 65-1 to 75-5. However, the normalization operation may be performed in various ways such as various arithmetic operations including addition, linear transformation, non-linear transformation, and the like, besides the multiplication, which may be variously designed and selected according to embodiments.

Further, in some embodiments, if the input image is composed of multi-channels (e.g., a color channel and a brightness channel), the normalization parameter may be defined for each channel. For example, a first normalization parameter may be defined for a first channel, and a second normalization parameter may be defined for a second channel. In this case, pixel values of the first channel may be normalized based on the first normalization parameter, and pixel values of the second channel may be normalized based on the second normalization parameter. As a result, the accuracy of the normalization and the performance of the target model can be improved.

Furthermore, in some embodiments, the normalization parameter may be independently defined for each specific region of the image, and the normalization may be independently performed for each specific region of the image based on the normalization parameter. In this case, the precision and accuracy of the normalization can be further improved. Such embodiments will be described in detail with reference to FIG. 18 to FIG. 23.

The normalization process according to the first embodiment of the present disclosure has been described with reference to FIG. 7 to FIG. 9. According to the above-described embodiment, normalization can be performed based on the range of pixel values. As a result, the normalization can be performed more finely, and the performance of the target model can be further improved.

Next, a normalization process according to a second embodiment of the present disclosure is described with reference to FIG. 10 and FIG. 11.

In the second embodiment, an input image may be normalized by using a sigmoid function. The sigmoid function has characteristics of converting an input value into an output value within a certain range. If the sigmoid function is applied, the input image can be appropriately transformed into a normalized image and the latent bias can be effectively removed, due to the above characteristics.

Figure 10:
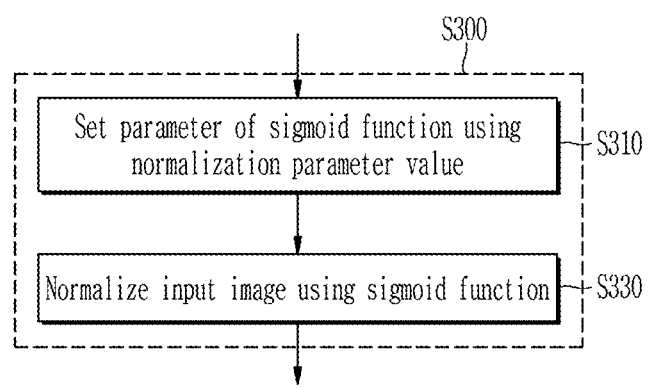
FIG. 10 is an exemplary flowchart showing a normalization process according to a second embodiment of the present disclosure.

A detailed procedure of a normalization process according to the second embodiment is shown in FIG. 10. As shown in FIG. 10, a parameter of the sigmoid function may be set by using a value of a normalization parameter (S310). In addition, the input image may be normalized by using the set sigmoid function (S330). That is, each pixel value of the input image may be adjusted to a value in a suitable range through the sigmoid function.

The parameters of the sigmoid function may be, for example, a parameter for adjusting displacement of the sigmoid function (e.g., a shift parameter related to x-axis or y-axis movement), a parameter for adjusting a size of an output value (e.g., a scale parameter for adjusting a size of a function value), and the like. However, since various other parameters can be defined, the technical scope of the present disclosure is not limited to the above listed examples.

Figure 11:
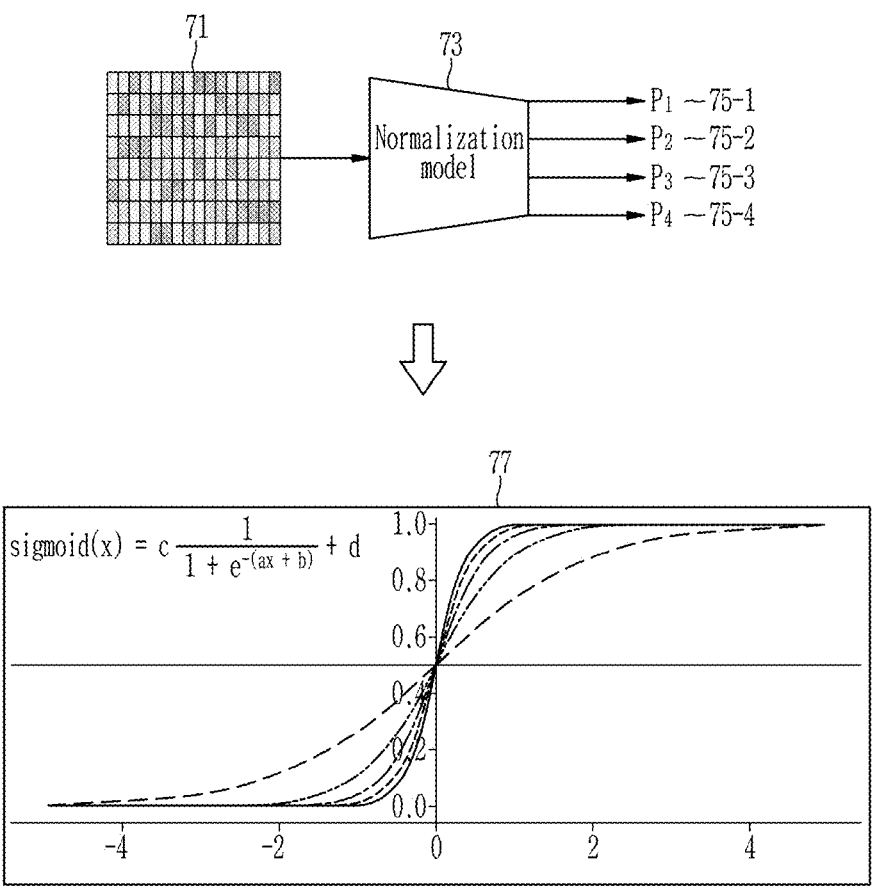
FIG. 11 is an exemplary drawing for explaining a normalization process according to a second embodiment of the present disclosure.

FIG. 11 exemplifies a case where there are four sigmoid function parameters. As exemplified in FIG. 11, a normalization model 73 may calculate values of the four normalization parameters 75-1 to 75-4 based on an input image 71, and each parameter of the sigmoid function 77 may be set by each of the values of the normalization parameters 75-1 to 75-4.

In some embodiments, the parameter of the sigmoid function may be set independently for each pixel value range and/or for channel, and the normalization may be performed independently for each pixel value range and/or for channel. In this case, the precision and accuracy of the normalization can be further improved.

The normalization process according to the second embodiment of the present disclosure has been described with reference to FIG. 10 and FIG. 11. According to the above-described embodiment, the normalization can be performed by using the characteristics of the sigmoid function. Therefore, the above-described normalization method can effectively remove the latent bias included in the image, and can be usefully used for improving the performance of the target model in the multi-domain environment in which various biases exist.

Next, a normalization process according to a third embodiment of the present disclosure is described with reference to FIG. 10 and FIG. 11.

In the third embodiment, a parameter (e.g., scale or shift parameter) of a linear transformation model may be set based on a value of a normalization parameter calculated by a normalization model. In addition, the input image may be normalized through the linear transformation model.

The technical concept inherent in the third embodiment may be used for windowing processing of an image (e.g., medical image having the DICOM (Digital Imaging and Communications in Medicine) format). The windowing means an operation of extracting pixel values in a specific range from a given image and transforming them into a specific format (e.g., 8-bit grayscale) so that an area of interest can be well seen. In general, values of windowing parameters (e.g., center and width) are defined in the DICOM header, but the values of the windowing parameters may be predicted through the normalization model. This is further described with reference to FIG. 12.

Figure 12:
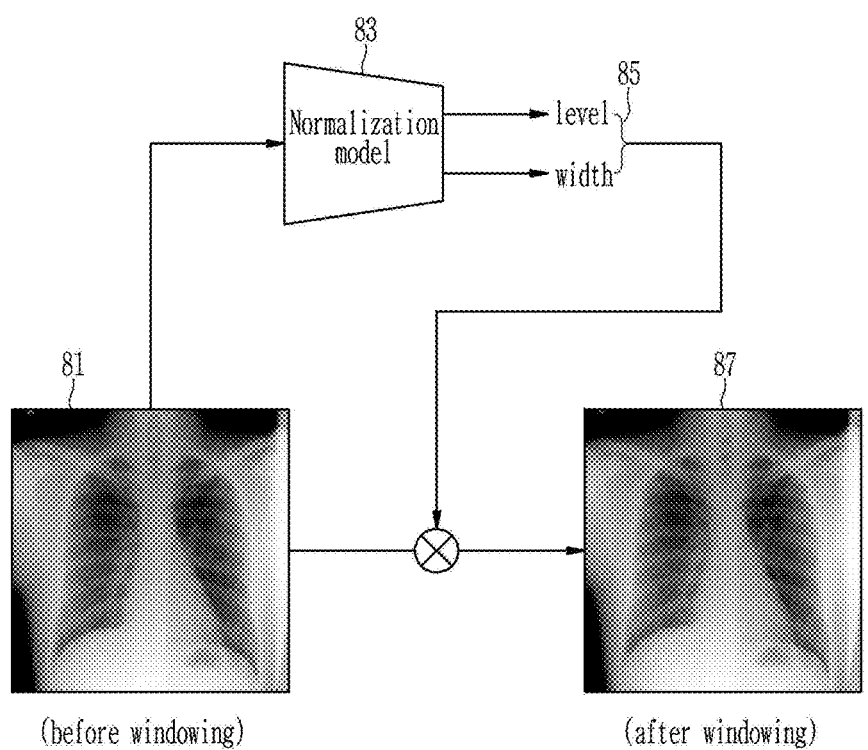
FIG. 12 is an exemplary drawing for explaining a normalization process according to a third embodiment of the present disclosure.

As shown in FIG. 12, a normalization model 83 may receive an image 81 and calculate values of windowing parameters 85 for the input image 81. Further, a windowing process for the image 81 may performed according to the values of the windowing parameters 85, and the windowed image 87 may be input to a target model. Since the normalization model 83 learns a prediction loss of the target model, the normalization model 83 can calculate the values of the windowing parameters 85 for causing the area of interest of the target task to be displayed well.

For reference, according to the DICOM standard, a window area [center−width/2, center+width/2] of an X-ray image defined by windowing parameters (center and width) is mapped to [0, 1] of the transformed image. For example, in a case of center=1000 and width=400, the area [800, 1200] of the actual X-ray image is mapped to [0, 1] of the transformed image. Accordingly, the windowing parameters (center and width) have a relationship like that of the parameters in the linear transformation model. In other words, there are always the parameter values of the linear transformation model that allows the same operation as the windowing parameters (center and width). For example, in a case of a=1/400 and b=−2 in the y=ax model, the [800, 1200] area of the X-ray is mapped to [0, 1].

In some embodiments, parameters of a non-linear transformation model (e.g., a sigmoid function) may be set based on a value of a normalization parameter calculated by the normalization model, and the input image may be normalized through the non-linear transformation model.

Next, a normalization process according to a fourth embodiment of the present disclosure is described with reference to FIG. 12.

Figure 13:
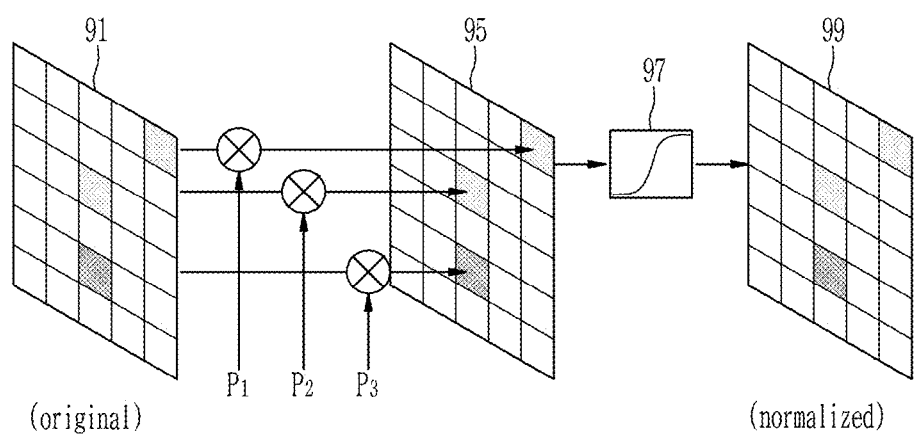
FIG. 13 is an exemplary drawing for explaining a normalization process according to a fourth embodiment of the present disclosure.

In the fourth embodiment, normalization may be performed based on a combination of the first to third embodiments described above. For example, as shown in FIG. 13, the first normalization process according to the first embodiment may be performed on an input image 91, and then the second normalization process according to the second embodiment may be further performed. The input image 91 may be transformed into an image 95 through the first normalization process, and the image 95 may be transformed into a normalized image 99 through the second normalization process based on a sigmoid function 97.

In some embodiments, the second normalization process may be performed first, and then the first normalization process may be performed.

The normalization process according to the fourth embodiment of the present disclosure has been described with reference to FIG. 14. According to the above-described embodiment, not only the pixel value of the input image can be adjusted to a value suitable for the target model through the first normalization process, but also the latent bias existing in the input image can be effectively removed through the second normalization process. As a result, the performance of the target model can be further improved.

The normalization process according to various embodiments of the present disclosure has been described above with reference to FIG. 7 to FIG. 13. Referring back to FIG. 3, the subsequent step is continuously described.

In step S400, a predicted label for the normalized input image is acquired through the target model. That is, the normalized input image may be input to the target model, and the label of the normalized input image may be predicted through the target model.

Figure 4:
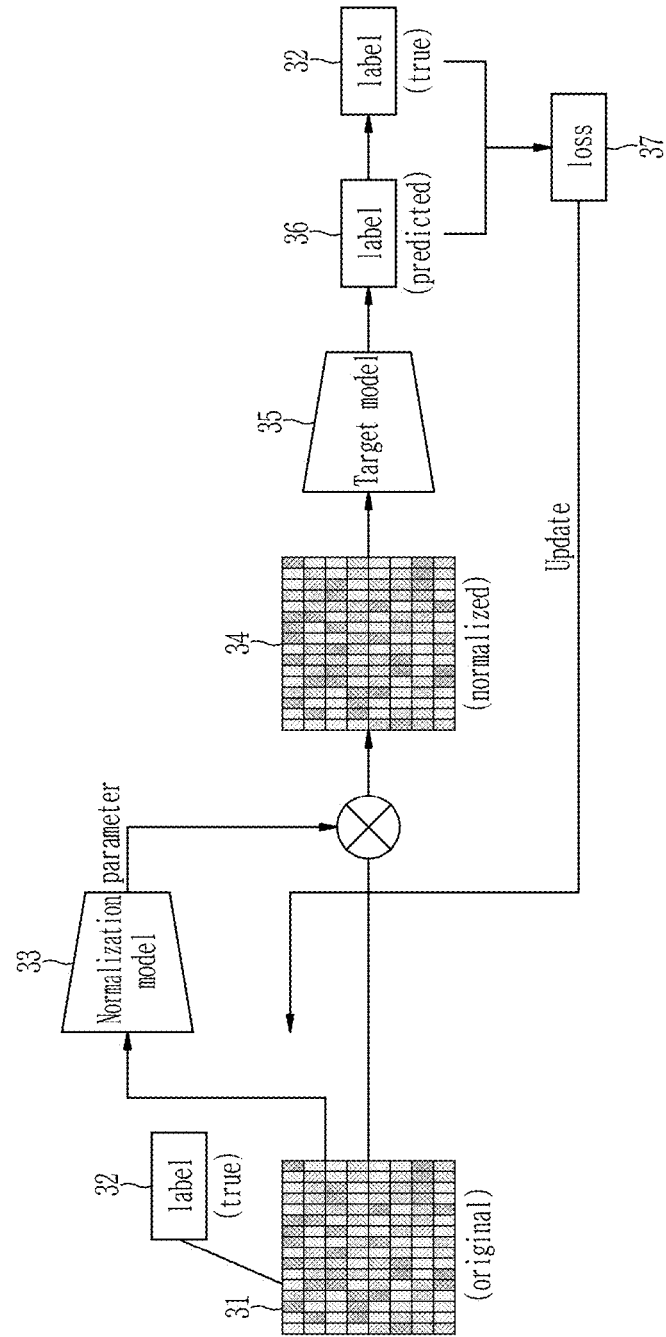
FIG. 4 is a drawing for explaining a normalization method according to some embodiments of the present disclosure.

In step S500, the target model and the normalization model are updated based on a loss of the predicted label. As shown in FIG. 4, a loss 37 of a predictive label may be calculated based on a difference between the predicted label 36 and a true label 32 output from a target model 35. The loss may be calculated by various loss functions. Since the type of loss function may vary depending on the target task, the technical scope of the present disclosure is not limited by the type of loss function.

Further, the target model 35 and the normalization model 33 may be updated so as to minimize the loss 37. It may be understood that the update is to adjust a value of a learnable parameter (i.e., a weight parameter of a neural network) included in each model. The values of the learnable parameters of the respective models 33 and 35 are adjusted so that the target model 35 can be learned so as to perform a target task more accurately and the normalization model 33 can be learned so as to normalize the input image into an image suitable for the target model. That is, the normalization model 33 can calculate the value of the normalization parameter more accurately as the update progresses.

In step S600, it is determined whether the learning is ended. The end of learning may be determined based on a preset end condition. Further, the end condition may be defined and set based on various criteria such as an epoch, existence of non-learned data, performance of the target model, and the like. Therefore, the technical scope of the present disclosure is not limited to a specific end condition.

In response to the determination that the end condition is not satisfied, the above-described steps S200 to S600 may be performed again. In response to the determination that the end condition is satisfied, the learning for the target model (or normalization model) may end.

The normalization method performed in the learning process of the target model has been described with reference to FIG. 3 and FIG. 13. Hereinafter, a normalization method performed in a prediction process is described with reference to FIG. 14.

Once a target model has been learned, a prediction process may be performed by using the target model. The prediction process may mean performing a target task on a prediction image using the learned target model. In addition, the prediction image may mean an image that is not labeled. A detailed procedure of the prediction process is shown in FIG. 14.

Figure 14:
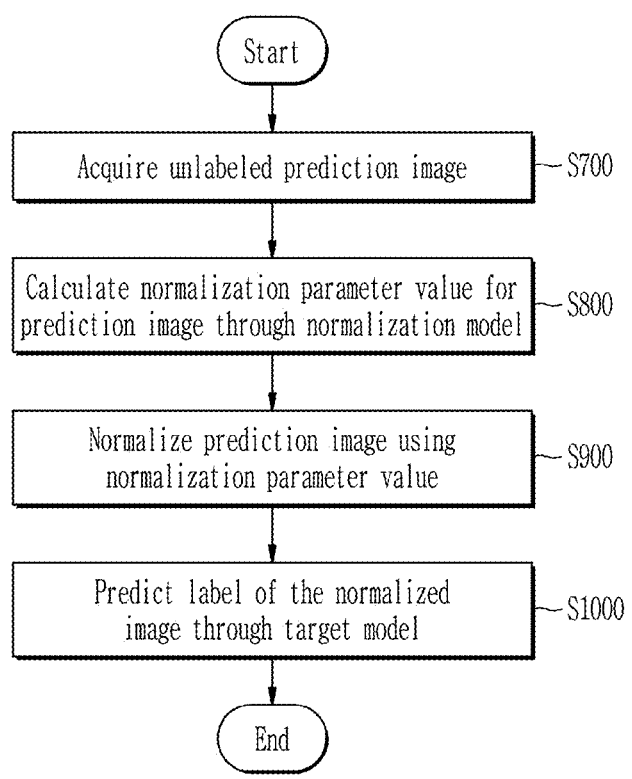
FIG. 14 is an exemplary flowchart showing a normalization method in a prediction process according to some embodiments of the present disclosure.

As shown in FIG. 14, the prediction process begins with step S700 of acquiring a prediction image.

In steps S800 and S900, a normalization process is performed on the prediction image. That is, a normalization parameter value for the prediction image is calculated through normalization model (S800), and the prediction image is normalized by using the normalization parameter value (S900). Since the normalization process is performed based on the learned normalization model, the prediction image may be transformed into an image suitable for a target model (i.e., an image that can be easily analyzed by the target model).

In step S1000, a label of the normalized prediction image is predicted through the target model. Since the normalized prediction image is an image transformed into a state suitable for the target model, the target model can more accurately predict the label of the prediction image. That is, the performance of the target model can be improved because a latent bias is removed from the prediction image and pixel values of the prediction image are adjusted to values optimized for the target model through the normalization process.

The method in which the normalization is performed in the prediction process has been described with reference to FIG. 14.

The technical concept of the present disclosure and various embodiments described above may be used to improve the performance of the target model in various fields. As an example, it is briefly described with reference to FIG. 15 that the technical concept of the present disclosure is used in a medical field (or domain).

As shown in FIG. 15, the technical concept of the present disclosure may be used to construct a diagnostic model 107 in the medical field. The diagnostic model 107 may be, for example, a model that performs lesion detection, lesion classification, lesion recognition, and the like, but the technical scope of the present disclosure is not limited thereto. FIG. 15 shows an example in which the diagnostic model 107 is implemented based on a convolutional neural network and performs diagnosis related to breast cancer in a medical image 101.

A normalization model 103 according to various embodiments of the present disclosure may normalize an input image 101 to an image 105 suitable for the diagnostic model 107 before the input image 101 is input to the diagnostic model 107. In addition, the diagnostic model 107 may be learned by using the normalized image 105, and the diagnostic model 107 may perform diagnosis using the normalized image 105. As a result, the accuracy of the diagnostic result can be improved.

Pixel information of the medical image required by the diagnostic model 107 may vary depending on a type of the medical image, a type of diagnostic task, and the like. In this case, the normalization model 103 may transform the input image into an image optimized for the diagnostic model 107 by learning a prediction loss of the diagnostic model 107. As a result, the accuracy of the diagnostic model 107 can be improved, and a satisfactory diagnostic assistance service can be provided based on the diagnostic model 107.

Hereinafter, an image transformation method according to some embodiments of the present disclosure is described with reference to FIG. 16 to FIG. 23.

Figure 16:
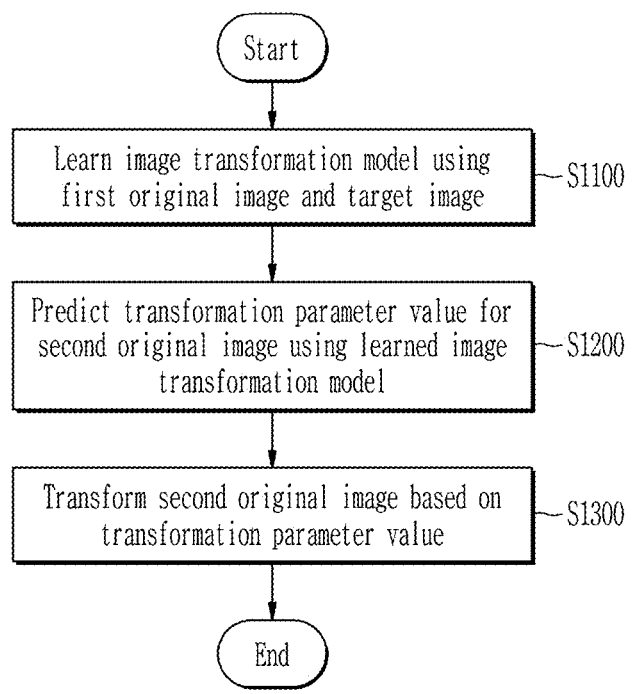
FIG. 16 is an exemplary flowchart showing an image transformation method according to some embodiments of the present disclosure.

FIG. 16 is an exemplary flowchart showing an image transformation method according to some embodiments of the present disclosure. The flowchart shown in FIG. 3 merely corresponds to an exemplary embodiment for achieving an object of the present disclosure, and some steps may be added or omitted as necessary.

As shown in FIG. 16, the image transformation method begins with step S1100 of learning a transformation model. More specifically, the transformation model may be learned by using a first original image and a target image (i.e., a true image). Here, the target image may mean an image into which an original image is desired to be transformed through the transformation model. As an example, when the original image is to be transformed into a tone-mapped image by a particular filter (or a tone mapping function), the target image may be the tone-mapped image obtained by applying the particular filter (or tone mapping function) to the first original image. As another example, when the original image is to be transformed into an image of a particular style, the target image may be an image obtained by transforming the first original image into the specific style. The target image may be obtained by various image transformation/correction programs, but the target image may be obtained by any kind of manner.

Figure 17:
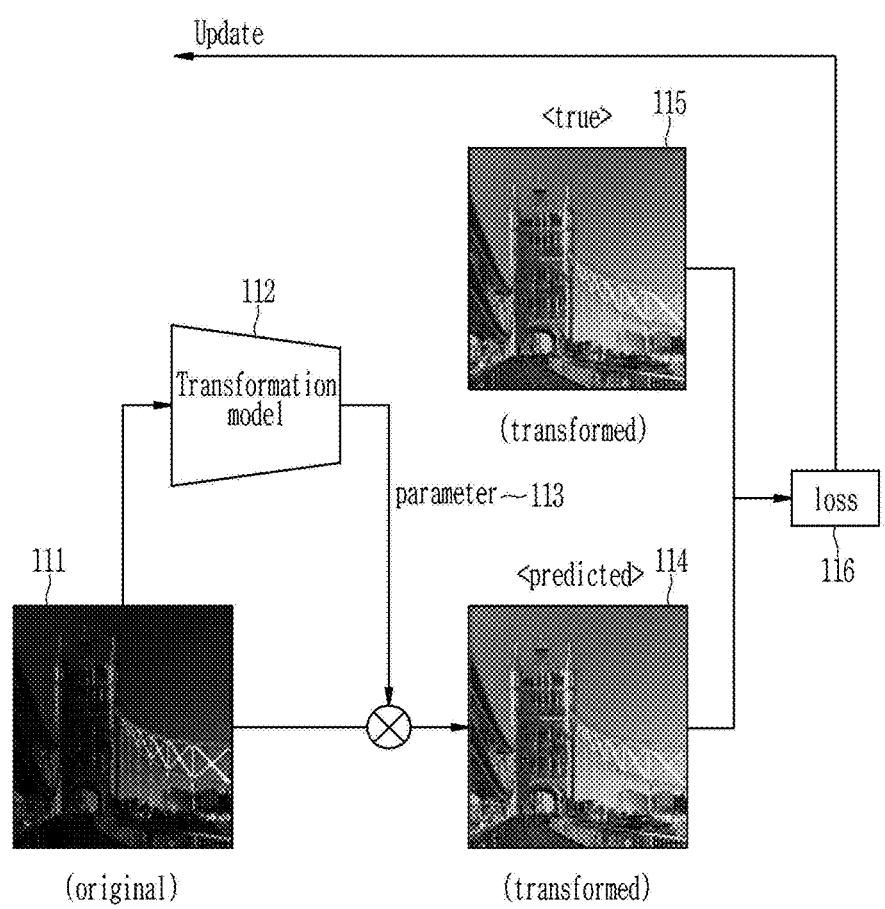
FIG. 17 is an exemplary drawing for explaining a learning step S1100 of an image transformation model shown in FIG. 16.

A detailed process of constructing the transformation model is exemplified in FIG. 17. As exemplified in FIG. 17, the transformation model 112 may receive an original image 111 and calculate a value of a transformation parameter 113 for the original image 111. Further, an image transformation process for the original image 111 may be performed based on the value of the transformation parameter 113 so that the transformed image 114 is obtained, and the transformation model 112 may be learned based on a loss 116 between the transformed image 114 and a target image 115. Once the learning is performed as described above, the transformation model 112 calculates a parameter value capable of transforming the input original image into a form of the target image (e.g., 115). The transformation model 112 may be implemented as a neural network specialized for image, such as a CNN, but the technical scope of the present disclosure is not limited thereto.

The transformation parameter 113 may include, for example, at least one of color temperature, luminance and saturation of an image. However, the kind of the transformation parameter 113 is not limited to the above-listed examples. For example, the transformation parameters 113 may include parameters of various transformation functions (e.g., tone mapping function, style transformation function) that can transform the original image into the form of the target image. Referring back to FIG. 16, the image transformation method is continuously described.

In step S1200, the transformation parameter value for a second original image is predicted by using the learned transformation model. The second original image may be an image different from the first original image, but may be the same image as the first original image. In this step, when the second original image is input to the learned transformation model, the transformation parameter value for the second original image may be calculated through the learned transformation model.

In step S1300, an image transformation process of transforming the second original image into the form of the target image is performed based on the calculated transformation parameter value. For example, the color temperature of the second original image may be adjusted according to the color temperature parameter value.

In some embodiments, the calculated transformation parameter value may be provided to a user. Then, the user may perform image transformation directly by using the provided parameter value as an initial value. For example, the user may set the initial value of the transformation parameter (e.g., the color temperature) to the provided parameter value through an image transformation program, finely adjust the transformation parameter value, and then perform the image transformation. According to the present embodiment, the usability of the transformation model can be further improved because the user can perform the image transformation (i.e., tone mapping) reflecting her/his subjectivity.

Further, in some embodiments, the calculated transformation parameter value may be provided to the user by being applied in a specific mode or a specific setting function. Then, the user may select the provided specific mode or specific setting function and perform the image transformation using the calculated transformation parameter value.

The image transformation method according to some embodiments of the present disclosure has been described above with reference to FIG. 17. Next, embodiments of the present disclosure for performing more precise and advanced image transformation are described with reference to FIG. 18 to FIG. 23. Embodiments to be described below may be applied to the normalization method described with reference to FIG. 3 to FIG. 15.

Figure 18:
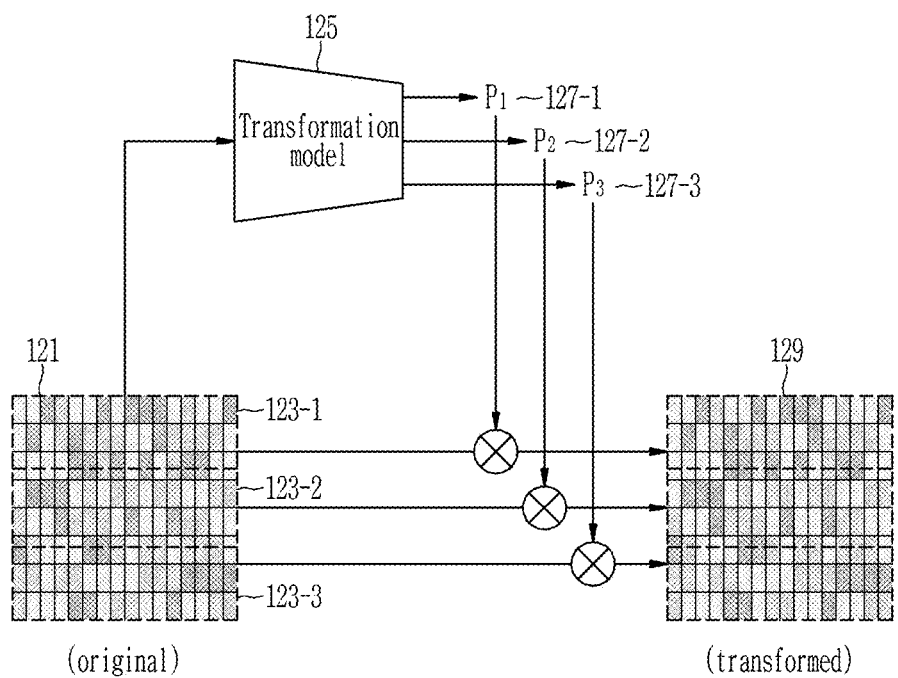
FIG. 18 is an exemplary diagram for explaining an image transformation process according to a first embodiment of the present disclosure.

FIG. 18 is an exemplary diagram for explaining an image transformation process according to a first embodiment of the present disclosure.

As shown in FIG. 18, in the first embodiment, transformation may be performed for each of areas 123-1 to 123-3 of an original image 121 so that the original image 121 is transformed into an image 129. For example, the first area 123-1 of the original image 121 may be transformed based on a value of a first transformation parameter 127-1, the second area 123-2 of the original image 121 may be transformed based on a value of a second transformation parameter 127-2, and the third area 123-3 of the original image 121 may be transformed based on a value of a third transformation parameter 127-3. Here, different transformation methods may be applied to the different areas of the original image 121, but the same transformation method may be applied to the different areas of the original image 121. The values of the transformation parameters 127-1 to 127-3 applied to the respective image areas 123-1 to 123-3 may be calculated by a transformation model 125. The transformation model 125 may be learned in the above-described manner to calculate the values of the transformation parameters 127-1 to 127-3.

In some embodiments, a plurality of transformation models, which correspond to a plurality of areas of the original image 121, respectively, may be used. In this case, the first area 123-1 of the original image 121 may be transformed based on the first transformation parameter value calculated by the first transformation model, the second area 123-2 of the original image 121 may be transformed based on the second transformation parameter value calculated by the second transformation model, and the third area 123-3 of the original image 121 may be transformed based on the third transformation parameter value calculated by the third transformation model.

FIG. 18 shows an example in which each of the areas 123-1 to 123-3 of the original image 121 is defined as a set of consecutive pixels. However, this example is provided only for convenience of understanding, and the area of the original image may be defined in any other manner (e.g., discrete form). For example, a first area of the original image may be defined as a set of pixels belonging to a first pixel value range, and a second area of the original image may be defined as a set of pixels belonging to a second pixel value range.

Figure 19:
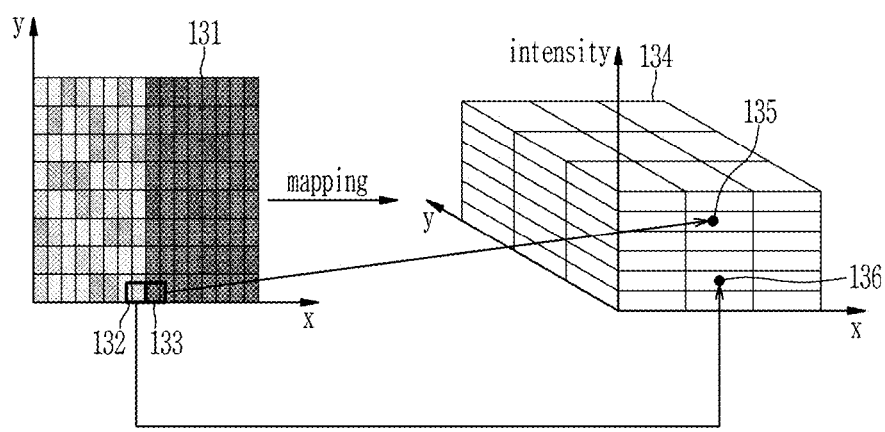
FIG. 19 and FIG. 20 are exemplary diagrams for explaining an image transformation process according to a second embodiment of the present disclosure.
Figure 20:
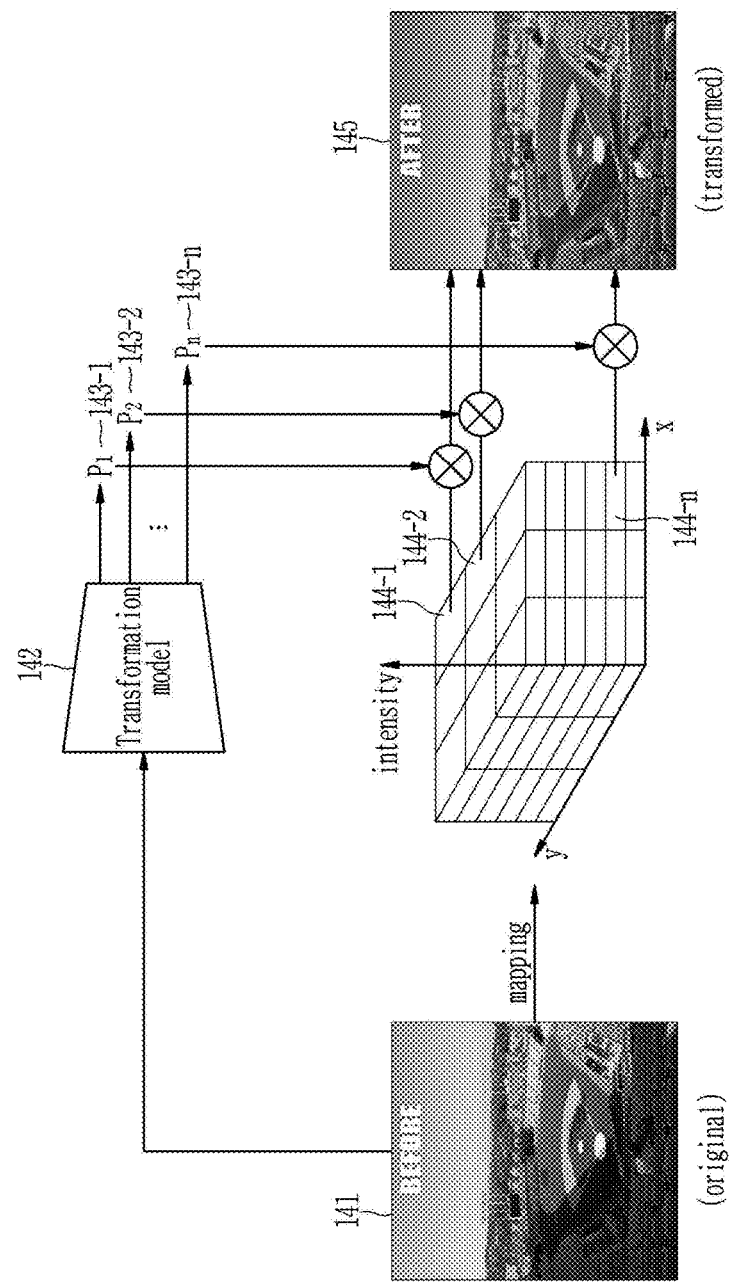

FIG. 19 and FIG. 20 are exemplary drawings for explaining an image transformation process according to a second embodiment of the present disclosure The second embodiment is a more advanced version of the first embodiment described above. The second embodiment relates to a method of performing image transformation for each area of an original image and using a bilateral grid to prevent blurring of an edge.

As shown in FIG. 19, a bilateral grid 134 may be defined by two axes (x-axis and y-axis) representing a position of a pixel on an original image 131 and one axis (z-axis) representing a magnitude of a value of the pixel. By using the bilateral grid 134 shown in FIG. 19, even if pixels are located adjacent to each other on the original image 131, they can be mapped to different grids according to a difference in pixel values. For example, two adjacent pixels 132 and 133 on an edge may be mapped to different grids 135 and 136 on the bilateral grid 134. Therefore, if the image transformation is performed for each grid, the image transformation can be performed by considering both a positional relationship and a size relationship of the pixels, and the edge can be preserved after the image transformation. Here, performing the image transformation on the grid means performing the image transformation on a set of pixels (i.e., a specific area on the original image) mapped to the grid. This is further described with reference to FIG. 20.

As shown in FIG. 20, a transformation model 142 may calculate values of a plurality of transformation parameters 143-1 to 143-n for an original image 141. Each of the transformation parameter 143-1 to 143-n may correspond to one or more grids. Further, image transformation may be performed for each grid by using the values of the transformation parameters 143-1 to 143-n. For example, the image transformation for a first grid 144-1 may be performed by using the value of the first transformation parameter 143-1, the image transformation for a second grid 144-2 may be performed by using the value of the second transformation parameter 143-2, and the image transformation for a n-th grid 144-n may be performed by using the value of the n-th transformation parameter 143-n. If the image transformation is performed for each grid, a more natural and finely-transformed image 145 can be generated while preserving edges of the original image 141.

Hereinafter, an image transformation process according to a third embodiment of the present disclosure is described.

The third embodiment is similar to the second embodiment described above in that image transformation is performed for each area defined on an original image. However, although the second embodiment described above defines each area using the bilateral grid, the third embodiment defines each are using a superpixel algorithm. The superpixel algorithm means an algorithm for grouping one or more pixels having similar characteristics into a superpixel. Representative examples of the superpixel algorithm include SLIC (Simple Linear Iterative Clustering) and SEEDS (Superpixels Extracted via Energy-Driven Sampling) algorithms. However, the technical scope of the present disclosure is not limited to the above-listed examples, and other types of superpixel algorithms may be used. Since the person of ordinary skill in the art will clearly understand the superpixel algorithm, a detailed description thereof is omitted. Hereinafter, the third embodiment is described in detail with reference to exemplary drawings shown in FIG. 21 to FIG. 23.

Figure 21:
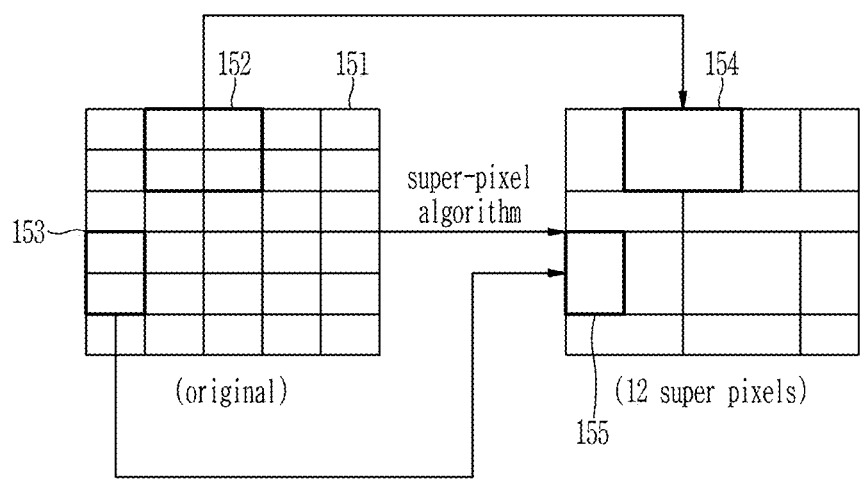
FIG. 21, FIG. 22, and FIG. 23 are exemplary diagrams for explaining an image transformation process according to a third embodiment of the present disclosure.

FIG. 21 exemplifies that a superpixel algorithm is applied to an original image 151 so that pixels having similar characteristics are grouped into twelve superpixels (e.g., 154 and 155). When the superpixels (e.g., 154 and 155) are formed as exemplified in FIG. 21, image transformation may be performed for each superpixel. Of course, the image transformation may be performed for each area including one or more superpixels.

For the image transformation, a transformation model may receive the original image 151 and superpixel information, and calculate a value of a he transformation parameter for transforming each superpixel (e.g., 154, 155). Here, a specific method of inputting the superpixel information to the transformation model may vary depending on embodiments.

Figure 22:
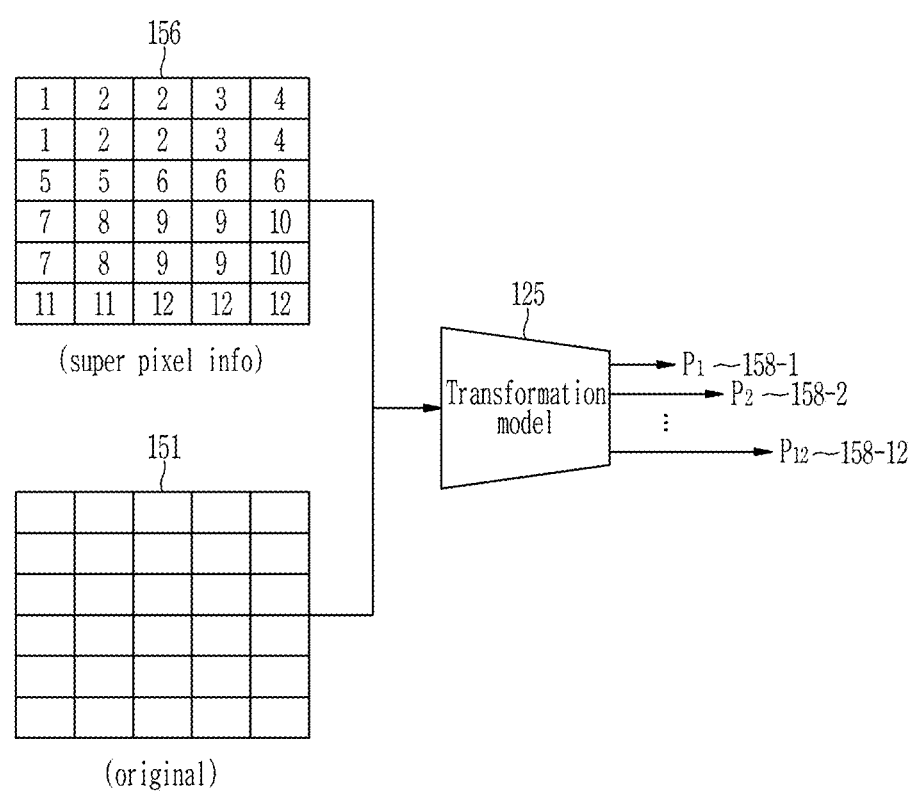

In some embodiments, as shown in FIG. 22, a map image 156 including a plurality of superpixel information may be input to a transformation model 157 together with the original image 151. For example, a multi-channel image may be constructed by stacking the map image 156 on the original image 151, and the multi-channel image may be input to the transformation model 157. Then, the transformation model 157 may calculate values of transformation parameters 158-1 to 158-12 corresponding to the respective superpixels (e.g., 154 and 155). The map image 156 may be configured to, for each pixel, have information (e.g., an identifier) of a superpixel to which the corresponding pixel belongs, but the technical scope of the present disclosure is not limited thereto.

Figure 23:
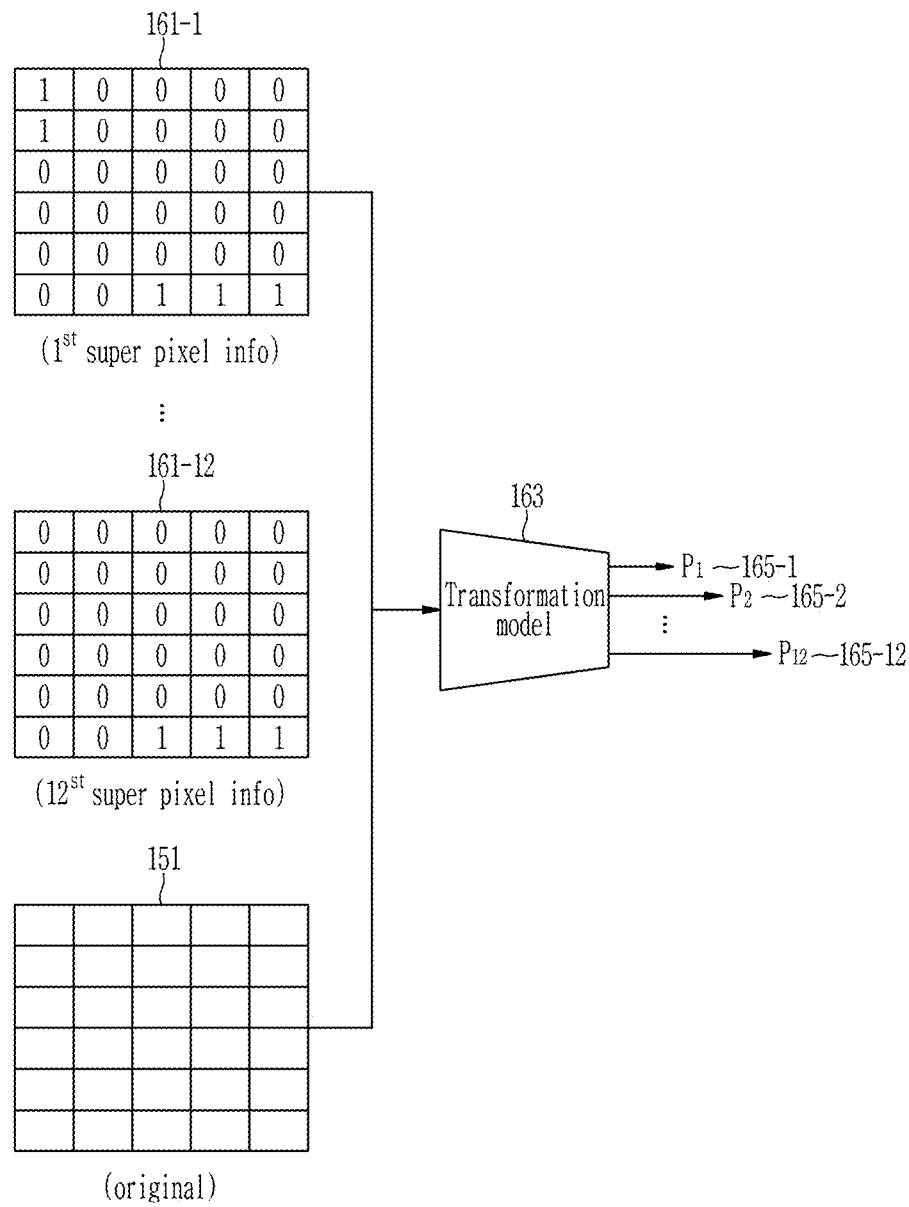

In some embodiments, as shown in FIG. 23, a plurality of map images 161-1 to 161-12 including individual superpixel information may be input to a transformation model 163 together with the original image 151. For example, the plurality of map images 161-1 to 161-12 may be stacked on the original image 151 to form a multi-channel image, and the multi-channel image may be input to the transformation model 163. Then, the transformation model 163 may calculate values of transformation parameters 165-1 to 165-12 corresponding to the respective superpixels (e.g., 154 and 155). Here, a first map image 161-1 may be configured by marking a specific value (e.g., 1) to pixels belonging to a first superpixel and marking another value (e.g., 0) to pixels not belonging to the first superpixel. A twelfth map image 161-12 may be configured by marking a specific value (e.g., 1) to pixels belonging to a twelfth superpixel and marking another value (e.g., 0) to pixels not belonging to the twelfth superpixel. However, the technical scope of the present disclosure is not limited thereto, and the map image (e.g., 161-1) may be configured in any manner as long as it can represent the individual superpixel information.

According to the third embodiment, since the image transformation is performed for each superpixel having the similar characteristics, sophisticated image transformation can be performed while maintaining the characteristics of the pixels.

The image transformation process according to various embodiments of the present disclosure has been described with reference to FIG. 18 to FIG. 23. According to the above-described embodiments, since the different transformation methods can be applied to the plurality of areas included in the original image, the more precise and advanced image transformation can be performed. For example, various types of tone mapping may be performed for the respective areas so that the more natural and finely-transformed tone-mapped image can be generated.

Hereinafter, an exemplary computing device 170 capable of implementing an apparatus (e.g., a learning apparatus, a normalization apparatus, or an image transformation apparatus 10 of FIG. 1) according to various embodiments of the present disclosure is described with reference to FIG. 24.

Figure 24:
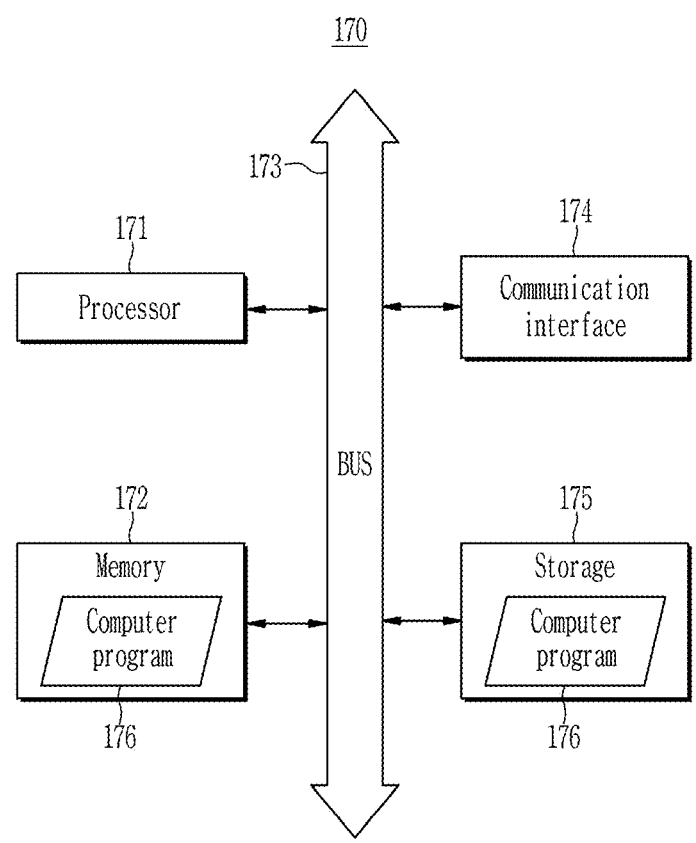
FIG. 24 is a drawing showing an exemplary computing device for implementing an apparatus according various embodiments of the present disclosure.

FIG. 24 is an exemplary hardware block diagram illustrating a computing device 170.

As shown in FIG. 24, the computing device 170 may include one or more processors 171, a bus 173, a communication interface 174, a memory 172 to which a computer program 176 to be executed by the processor 171 is loaded, and a storage 175 which stores the computer program 176. However, FIG. 24 shows only elements related to embodiments of the present disclosure. Therefore, the person of ordinary skill in the art will understand that general elements other than those shown in FIG. 24 may be further included.

The processor 171 controls overall operation of each element of the computing device 170. The processor 171 may be configured to include at least one of a central processing unit (CPU), a microprocessor unit (MPU), a microcontroller unit (MCU), a graphics processing unit (GPU), and any form of processor well known in the technical field of the present disclosure. The processor 171 may perform calculation of at least one application or program for executing methods or operations according to embodiments of the present disclosure.

The memory 172 stores various kinds of data, commands, and/or information. To execute methods or operations according to various embodiments of the present disclosure, the memory 172 may load one or more programs 176 from the storage 175. The memory 172 may be implemented as a volatile memory such as a random access memory (RAM), but the technical scope of the present disclosure is not limited thereto.

The bus 173 provides a communication function between elements of the computing device 170. The bus 173 may be implemented as various forms of buses, such as an address bus, a data bus, and a control bus.

The communication interface 174 supports wired or wireless Internet communication of the computing device 170. Further, the communication interface 174 may support various communication methods as well as Internet communication. To this end, the communication interface 174 may include a communication module well known in the technical field of the present disclosure. In some embodiments, the communication interface 174 may be omitted.

The storage 175 may non-temporarily store the one or more programs 176. The storage 175 may include a non-volatile memory, such as a read only memory (ROM), an erasable programmable ROM (EPROM), an electrically erasable programmable ROM (EEPROM), and a flash memory, a hard disk, a removable disk, or any form of computer-readable recording medium well known in the art to which the present disclosure pertains.

The computer program 176 may include one or more instructions which cause the processor 171 to perform methods or operations according to various embodiments of the present disclosure when loaded to the memory 172. In other words, the processor 171 may execute methods or operations according to various embodiments of the present disclosure by performing the one or more instructions.

For example, the computer program 176 may include instructions to perform an operation of calculating a value of a normalization parameter for an input image through a normalization model, an operation of normalizing the input image using the calculated normalization parameter value, an operation of acquiring a predicted label for the normalized input image through a target model, and an operation of updating the normalization model based on an loss of the predicted label. In this case, the learning apparatus 10 or the normalization apparatus 10 according to some embodiments of the present disclosure may be implemented through the computing device 170.

For example, the computer program 176 may include instructions to perform an operation of calculating a transformation parameter value for a first image through an image transformation model, an operation of transforming the first image using the calculated transformation parameter value, an operation of learning the image transformation model based on a loss between the transformed first image and a target image, and an operation of calculating a transformation parameter value for a second image using the learned image transformation model. In this case, the learning apparatus 10 or the image transformation apparatus 10 according to some embodiments of the present disclosure may be implemented through the computing device 170.

Various exemplary embodiments of the present disclosure and effects thereof have been described above with reference to FIG. 1 to FIG. 24. The effects of the present disclosure are not limited to those mentioned above, and other effects which have not been mentioned can be clearly understood by the person of ordinary skill in the art from the above description.

The concepts of the disclosure described above with reference to FIG. 1 to FIG. 24 may be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in another computing device, so that the computer program can be used in another computing device.

The technical concept of the present disclosure is not necessarily limited to these embodiments, as all the elements configuring the embodiments of the present disclosure have been described as being combined or operated in combination. That is, within the scope of the present disclosure, all of the elements may be selectively operable in combination with one or more.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to embodiments thereof, it will be understood by the person of ordinary skill in the art that various changes in form and detail may be made therein without departing from the spirit and scope of the present disclosure as defined by the following claims. The embodiments should be considered in a descriptive sense only and not for purposes of limitation.

What is claimed is:

1. An image transformation method performed by a computing device, the method comprising:
    calculating a transformation parameter for a first image through an image transformation model; and
    transforming the first image using the transformation parameter,
    wherein a plurality of pixels included in the first image are mapped to grids based on positions and intensity values of the plurality of pixels,
    wherein the transformation parameter for the first image comprises a first parameter corresponding to a first grid among the grids and a second parameter corresponding to a second grid among the grids, and
    wherein the transforming the first image comprises:
    transforming the first grid of the first image using the first parameter; and
    transforming the second grid of the first image using the second parameter.

2. The method of claim 1, wherein the transformation parameter for the first image comprises at least one of a color temperature, luminance, and saturation.

3. The method of claim 1, wherein the image transformation model outputs a transformation parameter for an input image, and
    wherein the image transformation model is trained based on a loss between a transformed input image transformed using the transformation parameter for the input image and a target image.

4. The method of claim 1, wherein the grids are a bilateral grid defined by two axes representing a position of a pixel and one axis representing a magnitude of a value of the pixel.

5. The method of claim 3, wherein the target image comprises a tone-mapped image generated by applying a specific filter to the first image.

6. An image transformation apparatus comprising:
    a memory that stores one or more instructions; and
    a processor that, by executing the stored one or more instructions:
    calculates a transformation parameter for a first image through an image transformation model;
    transforms the first image using the transformation parameter,
    wherein a plurality of pixels included in the first image are mapped to grids based on positions and intensity values of the plurality of pixels,
    wherein the transformation parameter for the first image comprises a first parameter corresponding to a first grid among the grids and a second parameter corresponding to a second grid among the grids, and
    wherein the transforming the first image comprises:
    transforming the first grid of the first image using the first parameter; and
    transforming the second grid of the first image using the second parameter.

7. The apparatus of claim 6, wherein the transformation parameter for the first image comprises at least one of a color temperature, luminance, and saturation.

8. The apparatus of claim 6, wherein the image transformation model outputs a transformation parameter for an input image, and
    wherein the image transformation model is trained based on a loss between a transformed input image transformed using the transformation parameter for the input image and a target image.

9. The apparatus of claim 6, wherein the grids are a bilateral grid defined by two axes representing a position of a pixel and one axis representing a magnitude of a value of the pixel.

10. The apparatus of claim 8, wherein the target image comprises a tone-mapped image generated by applying a specific filter to the first image.

* * * * *